United States Patent
Datla et al.

(10) Patent No.: US 8,601,545 B2
(45) Date of Patent: *Dec. 3, 2013

(54) METHOD AND SYSTEM FOR DIRECTING USER BETWEEN CAPTIVE AND OPEN DOMAINS

(75) Inventors: Raju Datla, Cherry Hill, NJ (US); Srini Avirneni, Chester Springs, PA (US)

(73) Assignee: Comcast Cable Holdings, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/336,672

(22) Filed: Dec. 23, 2011

(65) Prior Publication Data

US 2012/0096160 A1    Apr. 19, 2012

Related U.S. Application Data

(63) Continuation of application No. 11/933,669, filed on Nov. 1, 2007, now Pat. No. 8,108,911.

(51) Int. Cl.
| | |
|---|---|
| *H04L 29/06* | (2006.01) |
| *G06F 7/04* | (2006.01) |
| *G06F 15/16* | (2006.01) |
| *G06F 17/30* | (2006.01) |
| *H04L 12/28* | (2006.01) |

(52) U.S. Cl.
USPC ............... 726/3; 709/229; 709/249; 370/389

(58) Field of Classification Search
None
See application file for complete search history.

(56) References Cited

U.S. PATENT DOCUMENTS

| | | | |
|---|---|---|---|
| 5,440,632 | A | 8/1995 | Bacon et al. |
| 5,666,293 | A | 9/1997 | Metz et al. |
| 5,845,077 | A | 12/1998 | Fawcett |
| 6,023,464 | A | 2/2000 | Woundy |
| 6,308,289 | B1 | 10/2001 | Ahrens et al. |
| 6,393,585 | B1 | 5/2002 | Houha et al. |
| 6,501,750 | B1 | 12/2002 | Shaffer et al. |
| 6,529,910 | B1 * | 3/2003 | Fleskes .................... 707/770 |
| 6,553,568 | B1 | 4/2003 | Fijolek et al. |
| 6,560,203 | B1 | 5/2003 | Beser et al. |
| 6,570,855 | B1 | 5/2003 | Kung et al. |
| 6,574,796 | B1 | 6/2003 | Roeck et al. |
| 6,577,642 | B1 | 6/2003 | Fijolek et al. |
| 6,636,485 | B1 | 10/2003 | Fijolek et al. |
| 6,654,387 | B1 | 11/2003 | Beser et al. |
| 6,658,000 | B1 | 12/2003 | Raciborski et al. |
| 6,690,655 | B1 | 2/2004 | Miner et al. |
| 6,693,878 | B1 | 2/2004 | Daruwalla et al. |
| 6,715,075 | B1 | 3/2004 | Loukianov |
| 6,751,299 | B1 | 6/2004 | Brown et al. |

(Continued)

OTHER PUBLICATIONS

Extended European Search Report and Search Opinion for EP Patent Application No. 08846111.6 dated Feb. 7, 2011.

(Continued)

*Primary Examiner* — Shin-Hon Chen
(74) *Attorney, Agent, or Firm* — Banner & Witcoff, Ltd.

(57) ABSTRACT

A method for limiting user access to a captive domain or an open domain. The captive domain may include electronically accessible content that is selected/controlled by a service provider and the open domain may include electronically accessible content that is not completely selected/controlled by the service provider. The method may include configuring a modem or other user device in such a manner as to limit use access to the desired domain.

21 Claims, 2 Drawing Sheets

(56) References Cited

U.S. PATENT DOCUMENTS

| | | |
|---|---|---|
| 6,768,722 B1 | 7/2004 | Katseff et al. |
| 6,822,955 B1 | 11/2004 | Brothers et al. |
| 6,831,921 B2 | 12/2004 | Higgins |
| 6,836,806 B1 | 12/2004 | Raciborski et al. |
| 6,857,009 B1 | 2/2005 | Ferreria et al. |
| 6,865,613 B1 | 3/2005 | Millet et al. |
| 6,904,460 B1 | 6/2005 | Raciborski et al. |
| 6,917,675 B2 | 7/2005 | Lazarus et al. |
| 6,952,428 B1 | 10/2005 | Necka et al. |
| 7,007,080 B2 | 2/2006 | Wilson |
| 7,035,270 B2 | 4/2006 | Moore, Jr. et al. |
| 7,039,432 B2 | 5/2006 | Strater et al. |
| 7,058,055 B2 | 6/2006 | Mugica et al. |
| 7,065,047 B2 | 6/2006 | Boxall et al. |
| 7,085,814 B1 | 8/2006 | Gandhi et al. |
| 7,120,139 B1 | 10/2006 | Kung et al. |
| 7,127,049 B2 | 10/2006 | Godse et al. |
| 7,213,062 B1 | 5/2007 | Raciborski et al. |
| 7,272,846 B2 | 9/2007 | Williams et al. |
| 7,285,090 B2 | 10/2007 | Stivoric et al. |
| 7,293,078 B2 | 11/2007 | Danforth |
| 7,293,282 B2 | 11/2007 | Danforth et al. |
| 7,308,700 B1 | 12/2007 | Fung et al. |
| 7,334,258 B1 | 2/2008 | Ford et al. |
| 7,337,217 B2 | 2/2008 | Wang |
| 7,356,841 B2 | 4/2008 | Wilson et al. |
| 7,372,809 B2 | 5/2008 | Chen et al. |
| 7,415,603 B2 | 8/2008 | Woundy et al. |
| 7,443,883 B2 | 10/2008 | Seiden |
| 7,496,485 B2 | 2/2009 | Elfadel et al. |
| 7,496,652 B2 | 2/2009 | Pezzutti |
| 7,502,841 B2 | 3/2009 | Small et al. |
| 7,512,969 B2 | 3/2009 | Gould et al. |
| 7,526,538 B2 | 4/2009 | Wilson |
| 7,539,193 B2 | 5/2009 | Pfeffer et al. |
| 7,568,220 B2 | 7/2009 | Bursham |
| 7,600,003 B1 | 10/2009 | Okmianski et al. |
| 7,609,619 B2 | 10/2009 | Naseh et al. |
| 7,617,517 B2 | 11/2009 | Kay |
| 7,647,617 B2 | 1/2010 | Bartfeld et al. |
| 7,693,171 B2 | 4/2010 | Gould |
| 7,710,865 B2 | 5/2010 | Naseh et al. |
| 7,747,772 B2 | 6/2010 | Raciborski et al. |
| 7,769,886 B2 | 8/2010 | Naseh et al. |
| 7,836,092 B2 * | 11/2010 | Alaniz et al. ............... 707/802 |
| 7,839,870 B2 | 11/2010 | Siripunkaw et al. |
| 7,848,234 B2 | 12/2010 | McKinnon, III et al. |
| 7,881,225 B2 | 2/2011 | Siripunkaw et al. |
| 8,041,824 B1 * | 10/2011 | Maeng ......................... 709/229 |
| 8,042,132 B2 | 10/2011 | Carney et al. |
| 8,050,194 B2 | 11/2011 | Siripunkaw et al. |
| 8,108,911 B2 | 1/2012 | Datla et al. |
| 2001/0038690 A1 | 11/2001 | Palmer et al. |
| 2001/0049732 A1 | 12/2001 | Raciborski et al. |
| 2001/0051980 A1 | 12/2001 | Raciborski et al. |
| 2002/0010865 A1 | 1/2002 | Fulton et al. |
| 2002/0013948 A1 | 1/2002 | Aguayo et al. |
| 2002/0042819 A1 | 4/2002 | Reichert et al. |
| 2002/0061012 A1 | 5/2002 | Thi et al. |
| 2002/0103931 A1 | 8/2002 | Mott |
| 2002/0106017 A1 | 8/2002 | Dombkowski et al. |
| 2002/0116721 A1 | 8/2002 | Dobes et al. |
| 2002/0152384 A1 | 10/2002 | Shelest et al. |
| 2003/0014764 A1 | 1/2003 | Saladino et al. |
| 2003/0069965 A1 | 4/2003 | Ma et al. |
| 2003/0106067 A1 | 6/2003 | Hoskins et al. |
| 2003/0200548 A1 | 10/2003 | Baran et al. |
| 2004/0024912 A1 | 2/2004 | Fukao et al. |
| 2004/0177133 A1 | 9/2004 | Harrison et al. |
| 2004/0179539 A1 | 9/2004 | Takeda et al. |
| 2004/0190699 A1 * | 9/2004 | Doherty et al. .......... 379/201.12 |
| 2004/0213278 A1 | 10/2004 | Pullen et al. |
| 2004/0226051 A1 | 11/2004 | Carney et al. |
| 2005/0034115 A1 | 2/2005 | Carter et al. |
| 2005/0047442 A1 | 3/2005 | Volpe et al. |
| 2005/0055595 A1 | 3/2005 | Frazer et al. |
| 2005/0060749 A1 | 3/2005 | Hong et al. |
| 2005/0078668 A1 * | 4/2005 | Wittenberg et al. .......... 370/389 |
| 2005/0078688 A1 | 4/2005 | Sharma et al. |
| 2005/0122976 A1 | 6/2005 | Poli et al. |
| 2005/0123001 A1 | 6/2005 | Craven et al. |
| 2005/0204168 A1 * | 9/2005 | Johnston et al. ............... 713/201 |
| 2005/0246757 A1 | 11/2005 | Relan et al. |
| 2006/0031436 A1 | 2/2006 | Sakata et al. |
| 2006/0031921 A1 | 2/2006 | Danforth et al. |
| 2006/0159100 A1 | 7/2006 | Droms et al. |
| 2006/0173977 A1 | 8/2006 | Ho et al. |
| 2006/0184640 A1 | 8/2006 | Hatch |
| 2006/0206586 A1 | 9/2006 | Ling et al. |
| 2006/0256799 A1 | 11/2006 | Eng |
| 2006/0271772 A1 | 11/2006 | Woundy et al. |
| 2006/0271946 A1 | 11/2006 | Woundy et al. |
| 2006/0285544 A1 | 12/2006 | Taylor et al. |
| 2007/0016762 A1 | 1/2007 | Ho |
| 2007/0130471 A1 | 6/2007 | Walker Pina et al. |
| 2007/0133409 A1 | 6/2007 | McKinnon et al. |
| 2007/0174471 A1 | 7/2007 | Van Rossum |
| 2007/0177526 A1 | 8/2007 | Siripunkaw et al. |
| 2007/0180484 A1 | 8/2007 | Siripunkaw et al. |
| 2007/0183405 A1 | 8/2007 | Bennett |
| 2008/0285544 A1 | 11/2008 | Qiu et al. |
| 2009/0005066 A1 | 1/2009 | Florkey et al. |
| 2009/0063833 A1 | 3/2009 | Ho |
| 2009/0125958 A1 | 5/2009 | Siripunkaw et al. |
| 2009/0238349 A1 | 9/2009 | Pezzutti |
| 2010/0064356 A1 | 3/2010 | Johnston et al. |
| 2011/0026536 A1 | 2/2011 | Siripunkaw et al. |

OTHER PUBLICATIONS

Non-Final Office Action for U.S. Appl. No. 11/603,761 dated Apr. 16, 2007.
Non-Final Office Action for U.S. Appl. No. 11/603,761 dated Nov. 12, 2009.
Final Office Action for U.S. Appl. No. 11/603,761 dated Jun. 7, 2010.
International Search Report issued in PCT/US08/081422, mailed Dec. 23, 2008.
International Search Report issued in PCT/US08/081422, mailed Dec. 23, 2008/.
ISR issued in PCT/US06/45184, mail date Oct. 29, 2007.
International Preliminary Report on Patentability issued in PCT/US06/45184, mail date May 27, 2008.

* cited by examiner

METHOD AND SYSTEM FOR DIRECTING USER BETWEEN CAPTIVE AND OPEN DOMAINS

CROSS-REFERENCE TO RELATED APPLICATIONS

This application is a continuation of co-pending application Ser. No. 11/933,669 filed Nov. 1, 2007, the entire contents of which are incorporated herein by reference.

BACKGROUND OF THE INVENTION

1. Field of the Invention

The present invention relates to directing a user between captive and open domains.

2. Background Art

In a service provider network such as, but not limited to, those associated with television or high speed data service providers, particularly service providers that have a large customer base, one challenge faced by the service provider is to redirect customers to customized portals. These portals can be used for any number of reasons, including allowing customers to select service-specific configurations, displaying a warning message for reminding customers to take appropriate action, and/or forcing certain customers to the portal until the forced customer takes an appropriate action.

Existing approaches and/or solutions require intercepting all the network traffic and redirecting the traffic to service-specific portals in real time. This approach can be undesirable since the intercepted traffic can impact traffic for all customers. Another approach relies on reconfiguring a modem (Cable or DSL or FTTH) to direct the customer to the desired portal. This approach may not be preferred since the reconfiguring the modem requires the modem to be rebooting the modem before the customer is allowed to leave the specific portal.

BRIEF DESCRIPTION OF THE DRAWINGS

The present invention is recited with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
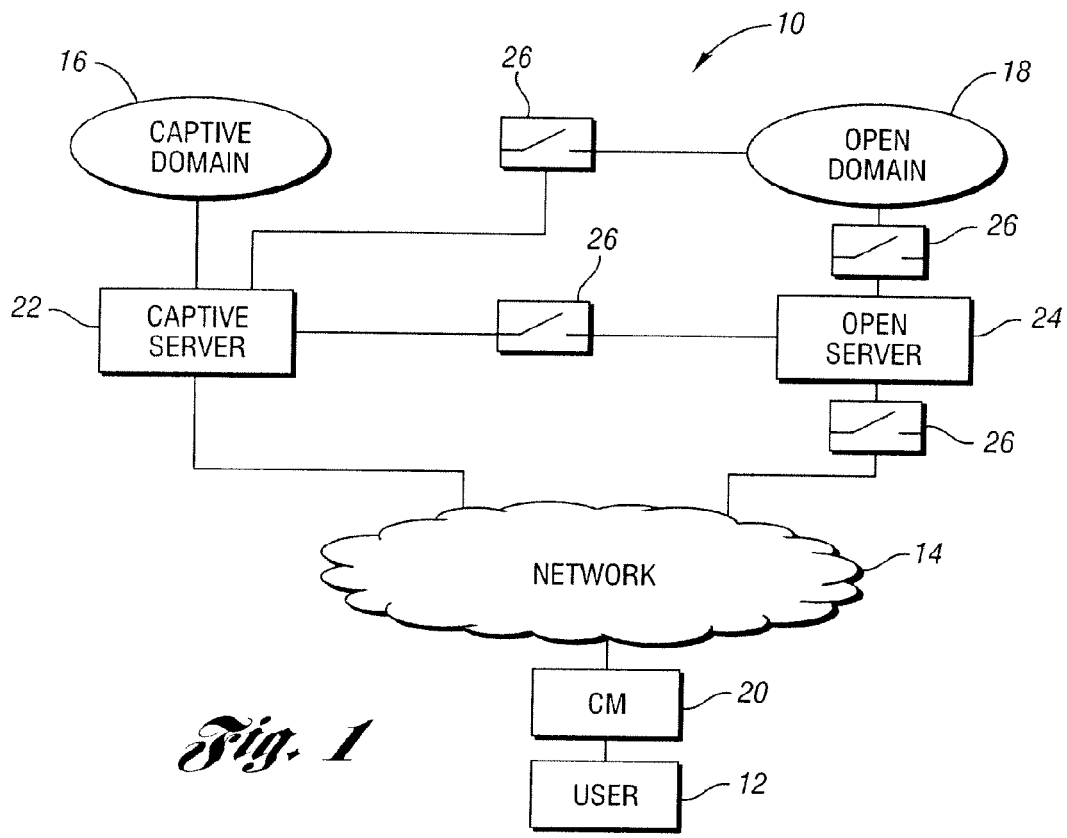
FIGS. 1-3 illustrate a system having captive and open domains in accordance with one non-limiting aspect of the present invention.

FIG. 1 illustrates a domain name system (DNS) 10 in accordance with one non-limiting aspect of the present invention. The system 10 may be associated with a television, high speed data, or other service provider (not shown) having capabilities to provide any number of services to a user 12 through signals carried over a service provider network 14. For exemplary purposes, the system is predominately described with respect to the service provider supporting high speed data-related operations. The present invention, however, is not intended to be so limited and fully contemplates its application to any number of environments besides those associated with high speed data.

The system 10 may include at least one captive domain 16 and one open domain 18. The domains 16, 18 may include servers, databases, and other sources of electronic content. These sources may be characterized as being associated with different domains 16, 18 for exemplary purpose and to emphasize different access and content restrictions associated therewith. The content of each domain, however, may be shared between the domains 16, 18, i.e., the same server may support content that is accessible through both of the domains 16, 18. The term 'domain' may be characterized as a reference address, or forced address, used to access the content therein, as described below in more detail. The term 'domain' is selected to correspond with grouping characteristics associated with the exemplary DNS protocols and architectures that may be used to control and direct access to the domains 16, 18.

The open domain 18 may be associated with the World Wide Web or other similar domain where any internet or other network user may be free to access any type of content, including content provided by entities other than the service provider or entities not under the control/approval of the service provider. The captive domain 16 may be a private domain associated with the service provider or otherwise having controlled or forced access where the same user is forced to access content specified by the service provider or otherwise authorized/controlled by the service provider (i.e., walled garden). The captive domain 16 may optionally be accessible only to devices (users) authorized by the service provider and/or devices connected to the service provider network 14.

A piece of customer premise equipment (CPE), for example a cable modem (CM) 20, may be included to facilitate user access to the service provider network 14. The cable modem 20 may be configured to receive instructions and other commands from the service provider, including instructions associated with its provisioning. This may allow the service provider to configure DNS and other attributes of the cable modem 20 associated with allowing the user to access one of 20 the domains 16, 18 through communications carried over the network 14. The attributes programmed to the cable modem 20 may be inherited by a computer or other device (not shown) connected to the cable modem 20 which the user controls to access the domains 16, 18. An ability of the service provider to individually and/or collectively provision its cable modems 20, or other equivalent device, to force user access to one of the domains 16, 18 allows the service provider to selectively control content accessible to its subscribers.

The cable modem 20 may be configured to facilitate communications with the service provider network 14 for relay to a captive server 22 and/or an open server 24 associated with the captive domain 16 and open domain 18, respectively. The servers 22, 24 may be DNS-type servers configured to facilitate access to the associated domains 16, 18. The servers 22, 24 may be configured to support any number of operations, including addressing operations associated with directing the user, or the cable modem 20 associated with the user, to specific portals/webpages associated with each domain 16, 18. The content associated with portals, web pages, etc. accessible through each domain 16, 18 may be hosted by elements associated with the domains 16, 18 and found through addresses and other instructions provided through the servers 22, 24.

FIG. 1 illustrates one configuration of the present invention where the cable modem 20 is instructed to facilitate communications with the captive server 22. The captive server 22 is further instructed to direct communications to the captive domain 16 and, optionally, to specific portals, webpages, etc. included within the captive domain 16. This arrangement may be beneficial if a need exists to force the user to access content specified by the service provider and included with the captive domain 16. For example, when the cable modem 20 is initially deployed and connected to the network 14, the service provider may restrict the cable modem 20 to access content available to through the captive domain 16, such as to provide a walled garden.

The cable modem 20, if initially restricted to accessing the walled garden, may begin an activation process where it is configured or otherwise 20 instructed to perform or support various services purchased or otherwise available to the user. During this period, the cable modem 20 and/or captive server 22 may be instructed to allow the user to access specific portals within the captive domain 16. This can be helpful in forcing the user to select desired operating parameters and to allow the service provider to make sale offers, indicate promotions, and provide other information that may be of interest to the user at a particular period of time.

Figure 2:
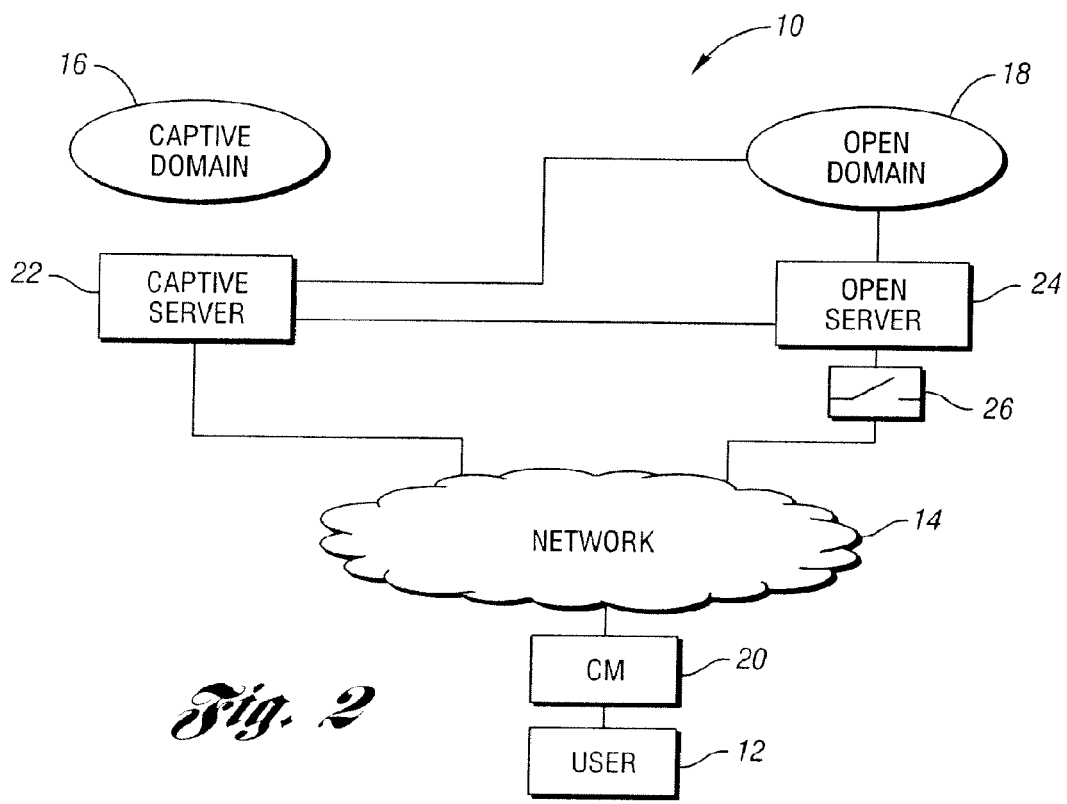

FIG. 2 illustrates the system 10 upon completion of the activation process or other event which limits access by the user the captive domain 16. The user is now able to access the open domain 18 and the content associated therewith. The access associated with FIG. 2 may require communications between the user and the open domain 18 to be routed or otherwise directed by the captive domain server 22, either through communications with the open server 24 (which may be necessary if the captive domain server 22 is unable to communicate with the open domain 18) and/or direct communications with the open domain 18. The use of the captive server 22 to facilitate access to the open domain 18 may be advantageous in allowing the user to access the open domain 18, after being restricted to the captive domain 16, without having to reboot or wait for reboot of the cable modem 20.

As one skilled in the art will appreciate, to change from one server to another, i.e., from the captive server 22 to the open server 24, the cable modem 20 may require a new configuration file, new parameter setting, or other instruction, which can only become effective once the cable modem 20 is rebooted. The present invention, at least with respect to one non-limiting aspect, contemplates its application to cable modems 20 which require reboot before new DNS attributes can be used to direct operations of the cable modem 20 and/or before they can be inherited by the device connected thereto.

The cable modem 20 may be rebooted manually through the user turning the cable modem 20 off and on and/or through the service provider directing the cable modem 20 to turn off and on. This type of reboot can be problematic since it requires the user to experience a short interruption in services and/or to perform 20 a manual operation to the cable modem 20. Cable modems 20 or other types of CPEs may be configured by the service provider to be active on the network 14 for a pre-defined time with a renew interval defined every x number of days. The renew interval may allow for the cable modem 20 or other types of CPE to stay active on the network 14 and receive new and/or additional parameters without any 25 interruptions, or at least until expiration of the renew period when the service provider forces the cable modem 20 to reboot. This can be helpful in checking whether the cable modem 20 is still active and to update the cable modem 20 operations without a manual reboot. This type of reboot can be problematic since it requires completion of the renew period before the user is able to switch from one server to another.

The present invention allows the user to effectively switch from one server 22, 24 to another without the delays and/or interruptions mentioned above since the present invention is able to configure the captive server 22 to support operations necessary for allowing the user to access the open domain 18 prior to reboot of the cable modem 20, i.e., without requiring the cable modem 20 to directly communicate with the open server 24. Since the operations of the cable modem 20 are not, at least initially, changed when transitioning from FIG. 1 to FIG. 2, the present invention is able to allow the user to access the open domain 18 without having to reboot the cable modem 20 and without a disruption in services.

Figure 3:
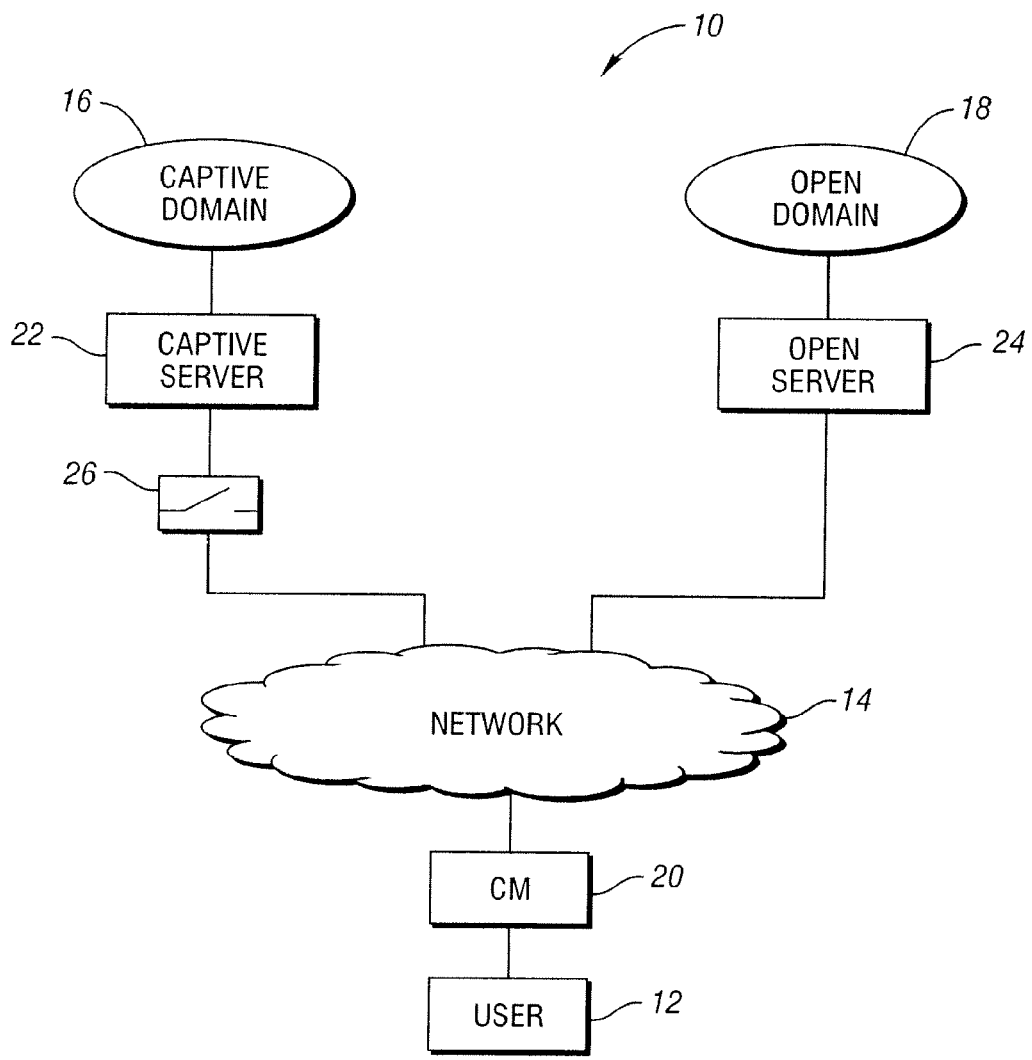

FIG. 3 illustrates the cable modem 20 communicating with the open server 24 instead of the captive server 22. This may occur upon expiration of the renew period and/or in response to a some other reboot, such as in response to the service provider issuing a signal to force an immediate reboot. As noted above and as long as the cable modem 20 receives the changes to its attributes, the reboot forces the cable modem 20 to facilitate communications with the open server 24 instead of the captive server 22 so as to provide access to the open domain 18 and its content. This can be helpful in moving the processing demands from the captive server 22 to the open server 24, freeing the captive server 22 to support captive domain communications with other users.

FIGS. 1-3 describe various aspect of the present invention and restricting user access to content available from one or more of the domains 16, 18. A number of switches 26 are shown to further demonstrate the restrictions. These switches 26 are shown of exemplary purposes and are not intended to reflect the need for actual switches are similar type devices to control access between the element connected thereto, although the present invention does contemplate the use of actual switches if needed in some environments. As such, while there may be physical or wireless connections between the elements connected by the switches 26, the switches 26 are primarily intended to symbolize access between the connected to elements. The switches 26 are shown in an open state to indicate an inability to communicate through the connection associated therewith.

The foregoing arrangement allows the present invention to address various business use cases. One use case may include relegating a customer to a captive portal during the activation process, where the customer is allowed to make service-specific configuration changes. Another use case may include relegating the 5 customer to a captive portal, with a warning page and appropriate corrective or ignore options, when the customer has reached a threshold limit. Some threshold limit examples may include excessive bandwidth usage, excessive downloads/updates, or excessive generation of email/spam. Another use case may include relegating the customer to a captive portal, such as to inform them of missing or delayed payments to the service provider. Still another use case may include relegating the customer to a friendly portal, such as to support enhanced features like birthday greetings, at the request of the customer or in response to a message received from another user in communication with the system. Another use case may include forcing the customer to a captive portal until a corrective action 15 is completed, such as to force the customer to correct an abuse of service, non-payment of bills, etc.

The present invention may be configured such that customers may be provisioned with specific DNS attributes without changing their provisioned service class and with the use of a DNS application controlled via a policy engine to redirect 20 the customers to various portals. The present invention may leverage provisioning flows for modems (Cable or DSL or FTTH modems) and their supported capabilities to redirect the devices behind the modem to a particular DNS domain. This may include the use of various mechanisms to relegate customer traffic, under certain scenarios, to a captive portal.

The present invention may operate in a 25 triple-play environment with various devices, such as high speed modems (cable, DSL, or FTTH), VoIP endpoints (MTAs and IADs), video set-top boxes, and wireless handsets (3G and 4G).

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method comprising:
    directing communications from a user device to a captive domain computing device while restricting access by the user device to an open domain;
    in response to authorizing the user device to access the open domain, receiving, at the captive domain computing device, requests from the user device that are directed to the open domain;
    after authorizing the user device to access the open domain, temporarily forwarding the requests from the captive domain computing device to the open domain until a new configuration file or parameter setting is downloaded to the user device to allow the user device to directly access the open domain without necessitating the captive domain computing device; and
    subsequent to the user device activating the new configuration file or parameter setting, the captive domain computing device ceases the temporary forwarding of the requests.

2. The method of claim 1, wherein the temporary forwarding further comprises the captive domain computing device forwarding a user device open domain request to an open domain computing device.

3. The method of claim 1, further comprising, after authorizing the user device to access the open domain, the user device continues to transmit open domain requests to the captive domain computing device until the user device reboots.

4. The method of claim 3, wherein the user device is a modem.

5. The method of claim 3, wherein the captive domain computing device is a domain name server.

6. The method of claim 1, further comprising authorizing the user device to access the open domain via an activation process that allows a user of the user device to configure services offered by a service provider associated with the user device.

7. The method of claim 1, wherein a captive domain contains only content specified by a service provider associated with the user device and the open domain contains content that is not specified by the service provider.

8. The method of claim 7, wherein the content in the captive domain includes a page indicating an account status that precludes access to the content in the open domain.

9. The method of claim 1, wherein the user device is a fiber-to-the-home modem.

10. The method of claim 1, wherein the user device is a digital subscriber line modem.

11. The method of claim 1, wherein the user device is a cable modem.

12. The method of claim 1, wherein the user device is a wireless mobile device.

13. A method comprising:
    directing, at a first computing device, communications from a user device to a captive domain while simultaneously restricting access by the user device to an open domain;
    in response to completion of an event, temporarily directing, at the first computing device, communications from the user device to the open domain until a new parameter setting is configured on the user device to allow the user device to directly access the open domain;
    in response to completion of the event, instructing the user device to communicate with a second computing device using the new parameter setting instead of the first computing device, wherein the captive domain contains only content specified by a service provider associated with the user device and the open domain contains content that is not specified by the service provider; and
    subsequent to the user device activating the new parameter setting, ceasing at the first computing device the temporary directing of communications from the user device to the open domain.

14. A method comprising:
    directing, at a first domain name computing device, communications from a user device to a captive domain while restricting access by the user device to an open domain;
    authorizing the user device to access the open domain;
    after authorizing the user device to access the open domain, using the first domain name computing device to temporarily process and forward open domain requests from the user device to the open domain, until the user device is configured with new parameter settings that allow the user device to directly access the open domain; and
    subsequent to the user device activating the new parameter settings, ceasing the temporary processing and forwarding of the open domain requests.

15. The method of claim 14, further comprising the first domain name computing device processing and forwarding communications from the user device to the open domain by forwarding the communications to a second domain name server.

16. The method of claim 14, further comprising using the first domain name computing device to process and forward the open domain requests from the user device to the open domain until the user device reboots.

17. The method of claim 16, wherein the user device is a modem.

18. The method of claim 14, further comprising authorizing the user device to access the open domain via an activation process that allows a user of the user device to configure services offered by a service provider associated with the user device.

19. The method of claim 14, wherein the captive domain contains only content specified by a service provider associated with the user device and the open domain contains content that is not specified by the service provider.

20. The method of claim 19, wherein the content in the captive domain includes a warning page indicating that a threshold limit associated with consumption of services offered by the service provider has been met.

21. The method of claim 19, wherein the content in the captive domain includes a page indicating an account status that precludes access to the content in the open domain.

\* \* \* \* \*